United States Patent [19]

Iwane et al.

[11] Patent Number: 5,198,854
[45] Date of Patent: Mar. 30, 1993

[54] CAMERA WITH AN ELECTRONIC FLASH LIGHT APPARATUS

[75] Inventors: Yukikazu Iwane, Kawasaki; Yoshiaki Ohtsubo, Chiba, both of Japan

[73] Assignee: Nikon Corporation, Tokyo, Japan

[21] Appl. No.: 849,094

[22] Filed: Mar. 9, 1992

[30] Foreign Application Priority Data

Mar. 13, 1991 [JP] Japan .................. 3-021743[U]

[51] Int. Cl.$^5$ .................. G03B 15/03; G03B 7/08
[52] U.S. Cl. .................. 354/413; 354/432; 354/149.1
[58] Field of Search .......... 354/413, 419, 149.1, 354/414, 421, 432

[56] References Cited

U.S. PATENT DOCUMENTS

| 4,423,940 | 1/1984 | Kashihara et al. | 354/149.1 |
| 4,664,495 | 5/1987 | Alyfuku et al. | 354/432 X |
| 4,666,280 | 5/1987 | Miyawaki et al. | 354/149.1 X |
| 4,914,461 | 4/1990 | Hori | 354/149.1 |
| 4,969,005 | 11/1990 | Tokunaga | 354/432 X |

Primary Examiner—Michael L. Gellner
Assistant Examiner—Jae N. Noh
Attorney, Agent, or Firm—Shapiro and Shapiro

[57] ABSTRACT

A camera having an electronic flash light apparatus capable of performing a phototaking with an optimal exposure both for an object and its background when a flash light phototaking is performed on the wide angle side of the camera with a backlight is provided with an electronic flash light apparatus for illuminating an object with ignition, driving means for varying the illuminating angles of the electronic flash light apparatus between the direction of the telescopic side and the direction of the wide angle side, driving means for moving a phototaking lens to the telescopic side and to the wide angle side, photometering means for photometering a principal object and the circumference of the main object respectively, luminance comparison means for comparing the luminance of the main object photometered by the photometering means and the luminance of the circumference of the main object, and control means for shifting the illuminating angle to the telescopic side by the electronic flash light apparatus driving means if the luminance comparison means determines the light to be a backlight when the phototaking lens is on the wide angle side.

1 Claim, 4 Drawing Sheets

CAMERA WITH AN ELECTRONIC FLASH LIGHT APPARATUS

BACKGROUND OF THE INVENTION

1. Field of the Invention

The present invention relates to a camera system having an electronic flash light apparatus.

2. Related Background Art

Traditionally, a camera system of the kind is of such a system that while its electronic flash light apparatus is set to perform the maximum ignition at all times, the aperture value at an igniting time is changed in accordance with an object distance and a film sensitivity, and in performing a phototaking with a backlight, the electronic flash light apparatus is automatically ignited for the backlight using the same system. for its phototaking lens, the illuminating angle Apparatus is controlled for an object interrelatedly the zooming of the phototaking lens. In other words, the illuminating angle of the electronic flash light apparatus is narrowed for a telescopic (hereinafter referred to as Tele) photography and Wide) photography.

However, in the conventional camera system described above, the illuminating angle of the electronic flash light apparatus is set to be narrowed for the Tele and widened for the Wide irrespective of a backlight of front light. As a for a backlight at the Wide side of a camera system, the exposure is set to match the luminance of the object for the phototaking, and the resultant exposure is over for the background. In other words, there is a problem that the resultant photography tends to be such that its background has a lesser density and becomes whitish.

SUMMARY OF THE INVENTION

It is therefore an object of the present invention to provide a camera system having an electronic flash light apparatus capable of performing a phototaking with an optimal exposure both for an object and its background when a flash light phototaking is performed for a backlight at the Wide side of the camera system.

In order to achieve the above-mentioned object, the present invention is designed to perform a flash light phototaking at a position where the igniting position of an electronic flash light apparatus, which is interrelated with the position of a phototaking lens, is caused to be interrelated with the phototaking lens when a luminance comparison means, which is provided for preventing any over exposure of the background resulting from the illumination of the electronic flash light only to the object, determines that the current light is a front light in the case of taking a flash light photography for a backlight on the Wide side of the position of the phototaking lens of the camera, or to perform a flash light phototaking by driving the igniting position of the electronic flash light apparatus from the Wide side to the Tele side when the current light is determined to be a backlight while the phototaking lens is positioned on the Wide side.

According to the present invention, when a flash light phototaking is performed by a camera system with its phototaking lens being positioned on the Wide side, the igniting position of the electronic flash light apparatus which is interrelated with the position of the phototaking lens is driven from the Wide side to the Tele side if the current light is determined to be a backlight.

DETAILED DESCRIPTION OF THE PREFERRED EMBODIMENTS

Hereinafter, in conjunction with the accompanying drawings, an embodiment of the present invention will be described in detail.

Figure 1:
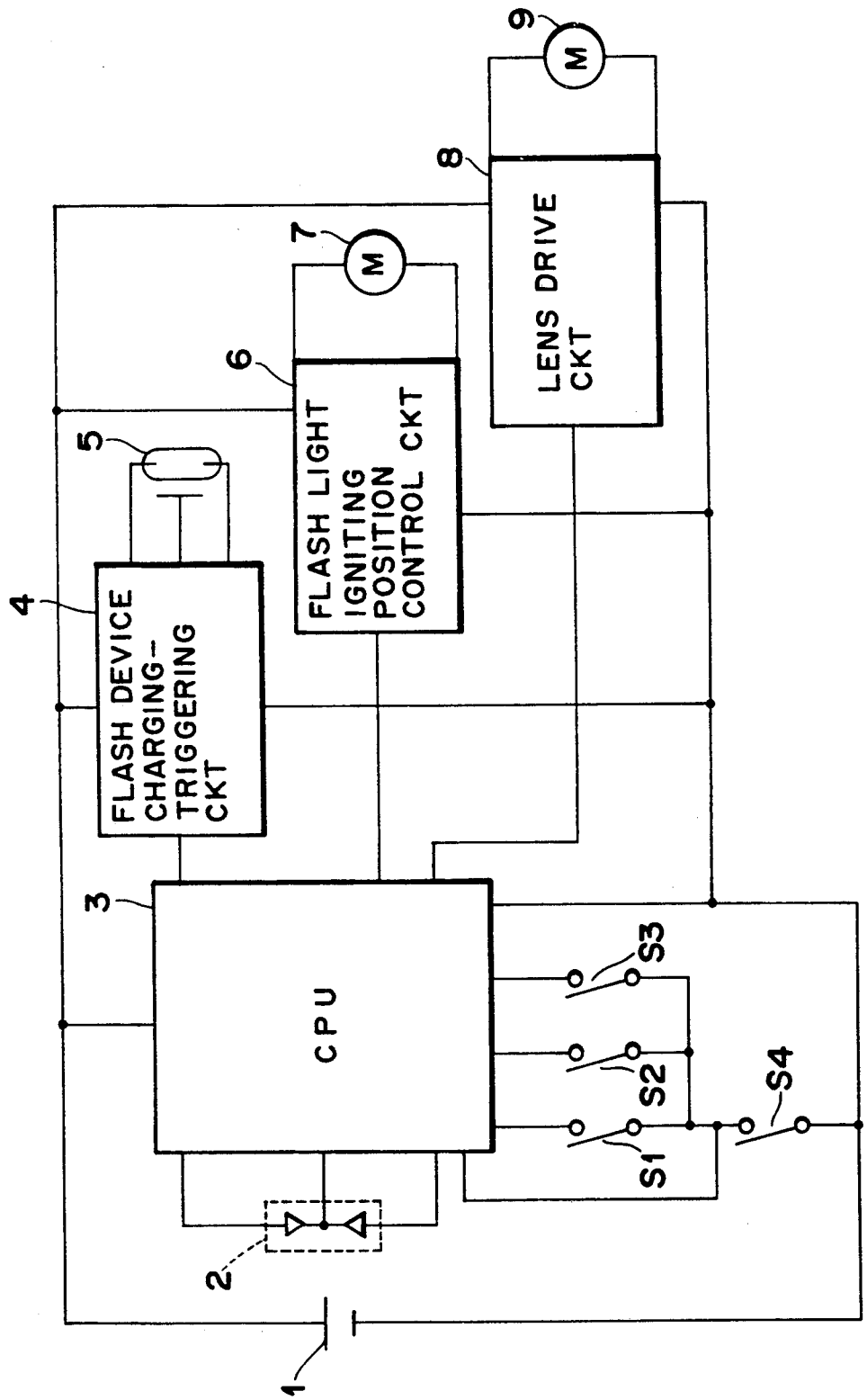
FIG. 1 is a block diagram of the electronic control device of a camera system to describe the structure of an embodiment of a camera system having an electronic flash light apparatus according to the present invention.

FIG. 1 is a block diagram of the electronic control device of a camera system to describe the structure of an embodiment of a camera system having an electronic flash light apparatus according to the present invention. In the present embodiment, the camera system is of a double focus system, and the description will be made of the case where the electronic flash light apparatus is applied to the camera system which is provided with an automatic ignition. To a CPU 3 in FIG. 1, an AE light receiving element 2, a flash device charging triggering circuit 4, a flash light igniting position control circuit 6, a lens drive circuit 8, and switches S1, S2, and S3 are connected. Also, to the flash device charging-triggering circuit 4, the electronic flash light apparatus 5 is connected, to the flash light igniting position control circuit 6, a flash light igniting position drive motor 7 is connected, and to the lens drive circuit 8, a lens drive motor 9 is connected. The AE light receiving element 2 detects light and outputs signals to the CPU 3. The flash device charging-triggering circuit 4 serves to charge the electric flash light apparatus 5 to trigger an emission of light. The flash light igniting position control circuit 6 controls the flash light igniting position drive motor 7 to shift the igniting position of the electronic flash light apparatus to the Tele side or Wide side. The lens drive circuit 8 controls the lens drive motor 9 to shift the lens to the Tele side or Wide side. The half press switch S1 is turned on by depressing a release button half to perform an automatic ranging and automatic photometering. The release switch S2 is turned on by depressing the release button full to cause a shutter to be opened or closed (including the ignition of the electronic flash light apparatus). The T/W change-over switch S3 serves to switch over the lens to the Tele side or Wide side. A cell 1 is connected to the CPU 3, flash device charging triggering circuit 4, flash light igniting position control circuit 6, and lens drive circuit 8, and the cell is turned on or off by the main switch S4 for the power supply.

Figure 2:
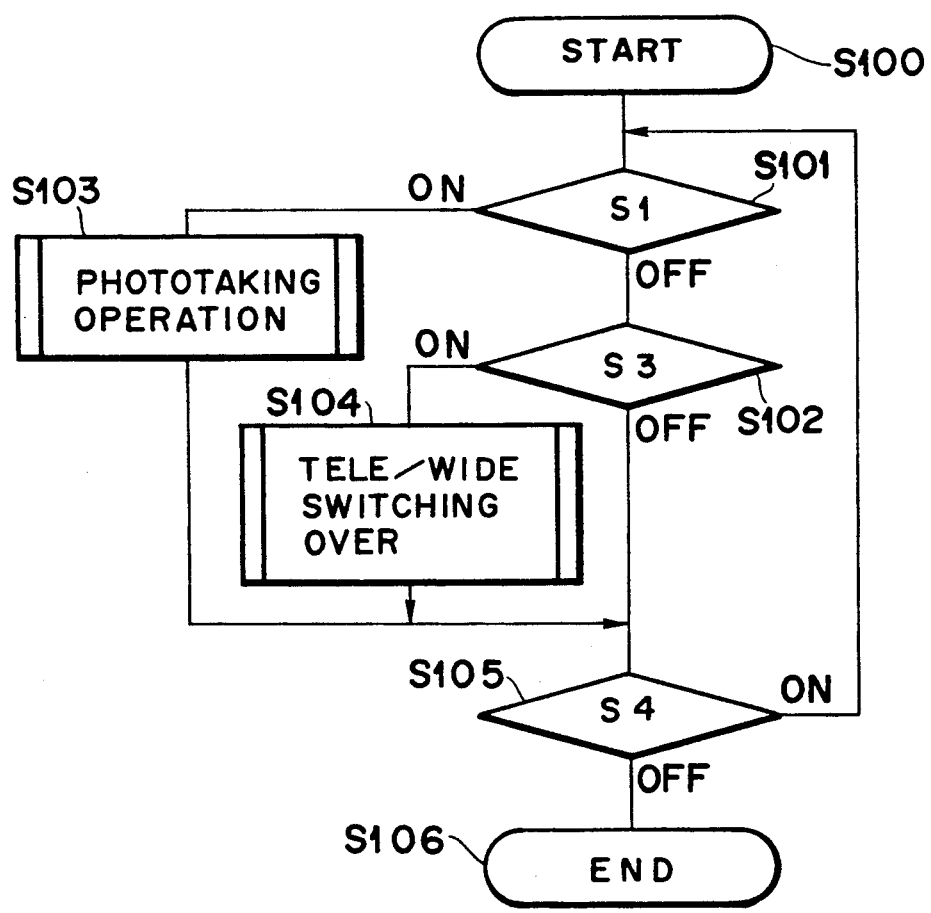
FIG. 2 is a flowchart showing the entire controlling flow of the electronic flash light apparatus of a camera system having an electronic flash light apparatus according to the present invention.

FIG. 2 is a flowchart showing the entire controlling flow of the electronic flash light apparatus of a camera system having an electronic flash light apparatus according to the present invention. In accordance with this flow chart, the operation of the electronic flash light apparatus will be described. In FIG. 2, when the main switch S4 is turned on, the program shown in FIG. 2 is actuated. Then, at first, in step S101, whether the half press switch S1 is depressed or not is determined. If depressed, the process proceeds to step S103 to a phototaking process is executed. Then, the process proceeds to step S105, and further to step S102 if the half switch S1 is not depressed. In the step S102, whether the T/W change-over switch S3 is depressed or not is determined. If depressed, the process proceeds to step S104 to execute switching over the T/W change-over switch, and then proceeds to step S105. If not depressed, the process proceeds to step S105. In the step S105, whether the main switch S4 is depressed or not is determined. If depressed, the process will return to the step S101 to repeat the operations in the loop formed by the step S101, step S102, and step S105. If not depressed, the process proceeds to step S106 to terminate the series of the operation.

Figure 3:
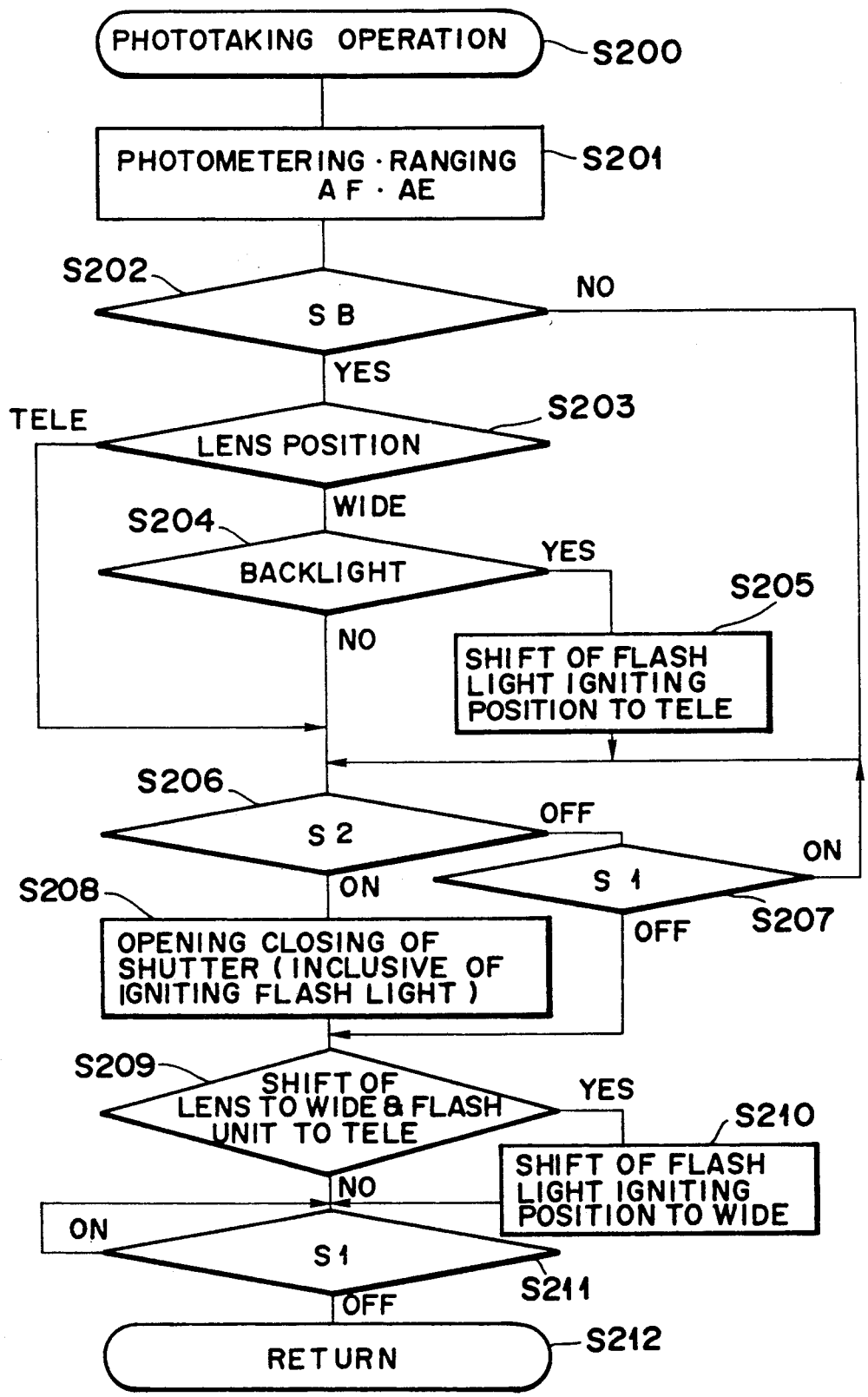
FIG. 3 is a flowchart showing the phototaking operation of a camera system having an electronic flash light apparatus according to the present invention.

FIG. 3 is a flowchart showing the flow of phototaking operation. In accordance with this flowchart, the phototaking operation will be described. In FIG. 3, when the half press switch S1 is depressed, a phototaking operation is actuated. In step S201, an automatic photometering and automatic ranging are executed. Then, the process proceeds to step S202. In the step S202, whether or not it is necessary to ignite the electronic flash light apparatus is determined according to the result of the automatic photometering. If the iginition is not needed, the process proceeds to step S206. If the ignition is needed, the process proceeds to step S203 to determine whether the current of lens position is on the Tele side or on the Wide side. If it is found to be on the Tele side, the process proceeds to step S204 to determine whether the result of the photometering is of a front light or of a backlight. If it is found to be of a front light, the process proceeds to step S206. If found to be of a backlight, to step S205 to shift the igniting position of the electronic flash light apparatus which is currently on the Wide side to the Tele side. Then, the process proceeds to step S206. In the step S206, whether the release switch S2 is depressed or not is determined. If depressed, the process proceeds to step S208 to open or close the shutter (including the charging of the electronic flash light apparatus to trigger the emission of light), and then proceeds to step S209. If not depressed, the process proceeds to step S207 to determine whether the half press switch S1 is depressed or not. If depressed, the process will return to the step S206. If not depressed, the process proceeds to step S209. In the step S209, whether or not the lens position is on the Wide side and the igniting position of the electronic flash light apparatus is on the Tele side is determined subsequent to having executed the phototaking. If affirmative, the process proceeds to step S210 to shift the igniting position of the electronic flash light apparatus from the Tele side to Wide side and then proceeds to step S211. If negative, the process proceeds to step S211. In the step S211, whether the half switch S1 is depressed or not is determined. If depressed, the process waits unit it is released. If it has already be released, the process proceeds to step S212 to cause the operational flow to be returned to the flowchart shown in FIG. 2.

Figure 4:
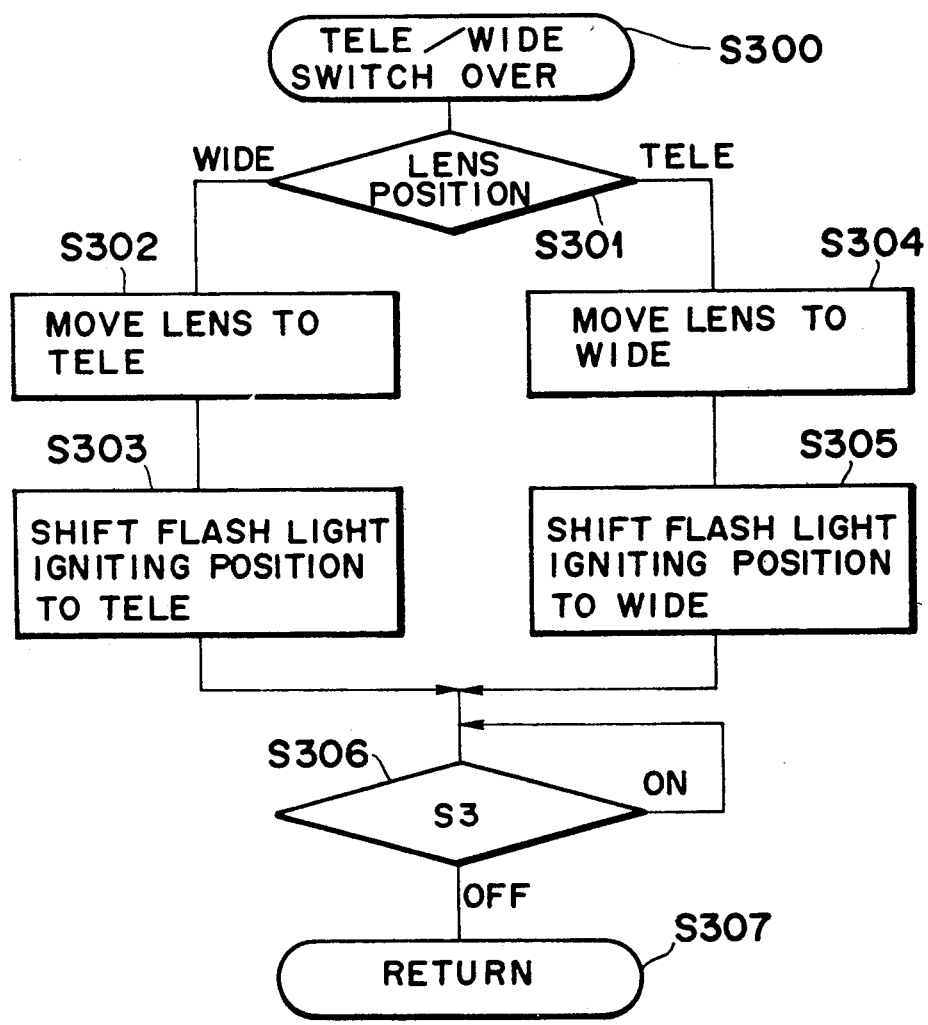
FIG. 4 is a flowchart showing the flow of the T/W switching over operation.

FIG. 4 is a flowchart showing the operational flow of the T/W change-over switch. In accordance with this flowchart, the switching over of the T/W change-over switch, will be described. In FIG. 4, when the T/W change-over switch S3 is depressed, the switching over of the T/W change-over switch is actuated. In step S301, whether the lens position is on the Tele side or on the Wide side when the T/W change-over switch S3 is depressed is determined, and if it is found to be on the Wide side, the process proceeds to step S302 and step S303 to move the lens to the Tele side and shift the electronic flash light apparatus to the Tele side. Subsequently, the process proceeds to step S306. If it is found to be on the Tele side, the process proceeds to step S304 and step S305 to move the lens to the Wide side and shift the electronic flash light apparatus to the Wide side. Subsequently, the process proceeds to step S306. In the step S306, whether the T/W change-over switch S3 is depressed or not is determined. If not depressed, the process will wait unit it is released. If depressed, the process proceeds to step S307 and causes the operational flow to be returned to the flowchart shown in FIG. 2.

Here, in the aforesaid embodiment, while the description has been made of the case where the camera system is of a double focus system, and the electronic flash light apparatus is applied to the camera having an automatic ignition, it is possible to obtain the same, effects as in the aforesaid case even when a camera having a zoom lens capable of varying focal lengths is adopted with an electronic flash light apparatus which can be forcibly ignited.

According to the present invention as described above, when a phototaking is performed with a camera system being ignited, the igniting position of the electronic flash light apparatus which is interrelated with the position of a phototaking lens is shifted from the wide side to the Tele side if the position of the phototaking lens is found to be on the Wide side with a backlight. Consequently, it is possible to obtain a highly desirable effect that a photograph is taken with an optimal exposure both for an object and for its background irrespective of a backlight or a front light.

What is claimed is:

1. A camera system having an electronic flash light apparatus, comprising:
    an electronic flash light apparatus for illuminating an object with ignition;
    driving means for varying the illuminating angles of said electronic flash light apparatus between the direction of the telescopic side and the direction of the wide angle side;
    driving means for moving a phototaking lens to the telescopic side and to the wide angle side;
    photometering means for photometering a principal object and the circumference of said main object respectively;
    luminance comparison means for comparing the luminance of the main object photometered by said photometering means and the luminance of the circumference of said main object; and
    control means for shifting the illuminating angle to the telescopic side by said electronic flash light apparatus driving means if said luminance comparison means determines the light to be a backlight when said phototaking lens is on the wide angle side.

* * * * *